US009790948B2

(12) United States Patent
Liu

(10) Patent No.: US 9,790,948 B2
(45) Date of Patent: *Oct. 17, 2017

(54) OSCILLATING MECHANISM AND CEILING FAN USING THE SAME

(71) Applicant: PAN AIR ELECTRIC CO., LTD., Taichung (TW)

(72) Inventor: Shin-Yuan Liu, Taichung (TW)

(73) Assignee: PAN AIR ELECTRIC CO., LTD., Taichung (TW)

( * ) Notice: Subject to any disclaimer, the term of this patent is extended or adjusted under 35 U.S.C. 154(b) by 2 days.

This patent is subject to a terminal disclaimer.

(21) Appl. No.: 15/010,477

(22) Filed: Jan. 29, 2016

(65) Prior Publication Data

US 2016/0146211 A1 May 26, 2016

Related U.S. Application Data

(63) Continuation of application No. 13/779,725, filed on Feb. 27, 2013, now Pat. No. 9,267,379.

(30) Foreign Application Priority Data

May 17, 2012 (TW) .............................. 101209324 U

(51) Int. Cl.
*F04D 25/10* (2006.01)
*F01D 5/02* (2006.01)
(Continued)

(52) U.S. Cl.
CPC ............. *F04D 25/105* (2013.01); *F01D 5/02* (2013.01); *F04D 25/088* (2013.01); *F04D 25/10* (2013.01); *F04D 29/325* (2013.01); *F16H 21/40* (2013.01)

(58) Field of Classification Search
CPC ........ F04D 25/08; F04D 25/10; F04D 25/105; F04D 19/00–19/005;
(Continued)

(56) References Cited

U.S. PATENT DOCUMENTS 1,879,150 A * 9/1932 Ferguson .............. F04D 25/105
475/11
RE20,714 E * 5/1938 MacDonald ............ F04D 25/10
415/125
(Continued)

FOREIGN PATENT DOCUMENTS

GB 208092 A 12/1923

*Primary Examiner* — Laert Dounis
(74) *Attorney, Agent, or Firm* — Muncy, Geissler, Olds & Lowe, P.C.

(57) ABSTRACT

A ceiling fan with an oscillating mechanism includes a clutch member for adjusting the angle of oscillation according to a user's need. When the motor is actuated, the rotating torque induced by the motor and the transmission mechanism is less than the rotational resistance of the clutch member such that the motor may drive the fan to oscillate. Further, when the user applies an external rotational force greater than the rotational resistance of the clutch member, the user can swing the fan to any angle as desired without rotating or shifting other members except the fan and the fan suspension tube. In this manner, undesired damage of the mechanism or motor due to inappropriately applied external force can be avoided efficiently.

16 Claims, 4 Drawing Sheets

(51) Int. Cl.
*F04D 25/08* (2006.01)
*F04D 29/32* (2006.01)
*F16H 21/40* (2006.01)

(58) Field of Classification Search
CPC ......... F16H 21/40–21/42; F16H 21/52; F16H 25/16; F16H 33/20; F16H 37/122; F16H 19/08
USPC ........................................ 416/100; 74/25–62
See application file for complete search history.

(56) References Cited

U.S. PATENT DOCUMENTS

| | | | | |
|---|---|---|---|---|
| 2,307,772 A * | 1/1943 | Duffy | ................... | H02K 5/1672 310/40 MM |
| 2,341,220 A * | 2/1944 | Jordan | ................... | F04D 25/105 416/100 |
| 2,898,709 A * | 8/1959 | Bednarski | ................. | B24B 3/54 451/241 |
| 2,900,127 A * | 8/1959 | Smith | ................... | F04D 25/105 415/125 |
| 4,417,480 A * | 11/1983 | Zacharias, Jr. | ...... | G10K 11/002 310/327 |
| 4,690,365 A * | 9/1987 | Miller | ................... | F16B 5/0233 248/188.4 |
| 2005/0097699 A1* | 5/2005 | Yagi | ........................ | B60S 1/166 15/250.3 |
| 2007/0237641 A1 | 10/2007 | Tsao | | |

* cited by examiner

OSCILLATING MECHANISM AND CEILING FAN USING THE SAME

CROSS-REFERENCE TO RELATED APPLICATION

This application is a continuation application of U.S. application Ser. No. 13/779,725, filed on Feb. 27, 2013, which claims a foreign priority to Taiwanese Patent Application 101209324 filed on May 17, 2012, all of which is incorporated by reference.

TECHNICAL FIELD

The present invention relates to a fan oscillating mechanism and a ceiling fan using the same, and more particularly to a fan oscillating mechanism which is adaptable to a conventional electric fan and enables the airflow direction of the fan to be adjusted as desired.

DISCUSSION OF THE BACKGROUND

In the conventional oscillating mechanism of an electric fan, the speed reduction mechanism is driven by the motor of the fan blade and is connected to one end of a connecting rod while the other end of the connecting rod is connected to the fan casing or base. In this way, the conventional oscillating mechanism of an electric fan is driven indirectly by the fan motor in order to oscillate.

Please refer to FIG. 1, which schematically shows the conventional oscillating mechanism of an electric fan. As shown in FIG. 1, a worm gear 111 meshed with a worm wheel 12 is disposed at the tail end of a primary driving shaft 11 of the fan. A reduction gear unit formed by two gears 13 and 14 is operatively coupled to the lower end of the worm wheel 12. The gear 14 has a shaft 15 connected pivotally to one end of a crank plate 16. The other end of the crank plate 16 is connected pivotally to one end of a connecting rod 17. The other end of the connecting rod 17 is connected pivotally to a driving element 171 received in a slot 181 of the casing 18.

The operation of the afore-mentioned conventional oscillating mechanism will be described as follows. Firstly, the fan rotates and the primary driving shaft 11 of the fan drives a speed reduction mechanism formed by the worm gear 111, the worm wheel 12, and the gears 13 and 14 of the reduction gear unit. Then, the shaft 15 of the gear 14 moves the crank plate 16, which indirectly moves the connecting rod 17. Finally, the driving element 171 moves the casing 18 in order to oscillate.

However, the oscillation angle of the conventional oscillating mechanism can not be adjusted. If an external force is imposed to vary the oscillation angle of oscillation, potential risks might occur, such as the collapse of the gear tooth, or fracture of the connecting rod or driving elements.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

The primary objective of the present invention is to provide a fan oscillating mechanism and a ceiling fan using the same, thereby making use of a clutch member for adjusting the oscillation angle of the fan according to users' need, whereby undesired damage of the interior mechanisms or motor due to inappropriate rotation can be avoided.

In order to achieve the above and other objectives, the fan oscillating mechanism according to a preferred embodiment of the present invention, comprises a motor transmission mechanism, a spindle link, a fan suspension tube, and a clutch member. The motor transmission mechanism includes a motor having a driving shaft, a crank plate having one end connected pivotally to the driving shaft, and a connecting rod having a first end and a second end, wherein the first end is connected pivotally to the other end of the crank plate. The spindle link includes a head end and a tail end, wherein the head end is connected pivotally to the second end of the connecting rod. The fan suspension tube includes a top end connected to the tail end of the spindle link and a bottom end connected to a fan device. The clutch member includes a wave washer disposed between the spindle link and the fan suspension tube, and the clutch member is used to provide rotational resistance. Furthermore, the clutch member can be formed by clutch lining, dampers or an electromagnetic clutch device in order to achieve its clutch function.

When the motor is actuated, the driving shaft rotates the crank plate to move the connecting rod so as to rotate the spindle link. As the rotating torque induced by the spindle link is less than the rotational resistance of the clutch member, the spindle link may move the fan suspension tube. This is the normal operating state in which the oscillation of the fan is actuated by the motor. On the other hand, when the fan suspension tube is subjected to an external rotational force which is greater than the rotational resistance of the clutch member, the fan suspension tube runs freely. In other words, when a user applies an external rotational force that is greater than the rotational resistance of the clutch member, the oscillation angle can be changed as desired. Following this change, the other members, except the fan suspension tube, will not rotate or shift in order to efficiently preclude any undesired damage of the mechanism or motor due to inappropriately applied external force. Further, as the motor is designed to not make reverse rotation and can operate continuously, the service life of the motor is prolonged.

Preferably, the clutch member of the present invention may comprises two wave washers and two flat washers, with the two wave washers disposed between the two flat washers, and the clutch member is fitted on the outside of the spindle link. In this manner, the clutch member of the present invention, which is formed of two wave washers and two flat washers, is simple in construction and low in cost. Further, the rotational resistance of the clutch member can be adjusted as desired by simply changing the quantity or the specification of the wave washer and the flat washer.

Furthermore, the second end of the connecting rod in the present invention has an oval shaped slot, and the end face of the head end of the spindle link is provided with an axially extending raised post at one side thereof. The raised post is fitted with a sleeve thereon and is received in the oval shaped slot along with the sleeve in such a manner that the sleeve is rotatable with respect to the raised post. In this way, as the connecting rod of the present invention has an oval shaped slot to provide spaces for rotation and displacement during operation and also owing to the assistance of the sleeve, the connecting rod and the spindle link can have a smooth operation without interference occurring therebetween so that the service life can be significantly extended. Moreover, the oval shaped slot requires less labor and material than its conventional circular counterpart and provides an extended permissible tolerance range. Consequentially, unexpected damage due to assembly error is more likely avoided. However, as compared with a circular slot, the oval shaped slot may cause the oscillation of the fan device to lag behind by a few seconds, whereby the fan device is prone to vibrate.

Therefore, the present invention may adopt the oval shaped slot or circular slot in the preferred embodiment. However, the present invention is not limited to said oval or circular slot. Slots having other shapes such as a rectangular shape, curved shape, polygonal shape and the like can also be adapted in the present invention.

Further, a transverse cut-out is provided at one side of the head end of the spindle link, which is provided to prevent interference between the elements during operation and effectively reduce the volume occupied by the entire elements. Likewise, the design of the cut-out of the present invention can save on material, reduce labor cost, and extend the tolerance range so that damage caused by assembly error is reduced.

Moreover, the present invention comprises two wave washers, two flat washers and a fixing device. The first end of the connecting rod is held between the two wave washers, and then the two flat washers are respectively disposed on the upper side and the lower side of the two wave washers. The fixing device is used to maintain the connecting rod being held between the two wave washers. The fixing device can be a locking screw which penetrates through the two wave washers, the two flat washers, and the first end of the connecting rod, and is threaded or fixed to the other end of the crank plate. In this way, the arrangement of the wave washers and the flat washers in the present invention can provide sufficient cushioning and connection tolerance between the connecting rod and the crank plate so that the service life of the components is prolonged. Additionally, the extension in tolerance range facilitates the assembly of the elements.

Moreover, the present invention comprises a motor base and a spindle base. A motor can be mounted on the motor base and the spindle base can be fixed to the motor base. The spindle base includes a bearing collar through which the spindle link penetrates and connects to the top end of the fan suspension tube. The spindle base can be a U-shaped base, and two limiting screws are screwed onto the surface of the base plate of the spindle base. A stop block extends radially outwards from the end face of the head end of the spindle link and the stop block, and can reciprocate between the two limiting screws along with the rotation of the spindle link. In this way, when the spindle link rotates to move the stop block to urge against one of the two limiting screws, the driving shaft of the motor discontinues its rotation and revolves to cause the fan to revolve, which indirectly oscillates the fan in cycle. In this manner, the two limiting screws can be used to limit the oscillation range of the fan.

Furthermore, the tail end of the spindle link in the present invention has an external thread provided thereon, while the top end of the fan suspension tube has an inner thread provided thereon. The inner thread on the top end of the fan suspension tube is to be engaged with the external thread on the tail end of the spindle link, and the clutch member is held therebetween in such a manner that the fan suspension tube and spindle link are not fully fastened with each other so as to achieve free rotation relative to each other.

Moreover, the fan suspension tube in the present invention has a baffle plate provided on its top end, while one of the two limiting screws is a longer screw which penetrates through the base plate of the spindle base and has an abutting segment protruding downward. When the fan suspension tube is in an idling state, the abutting segment stops the baffle plate from rotating beyond 360 degrees and breaking the wire. In addition, over-rotation of the fan suspension tube in threading with the spindle link, which may result in the loosening and falling off of the suspension tube, can also be prevented.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a wavelength division multiplexer/demultiplexer. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
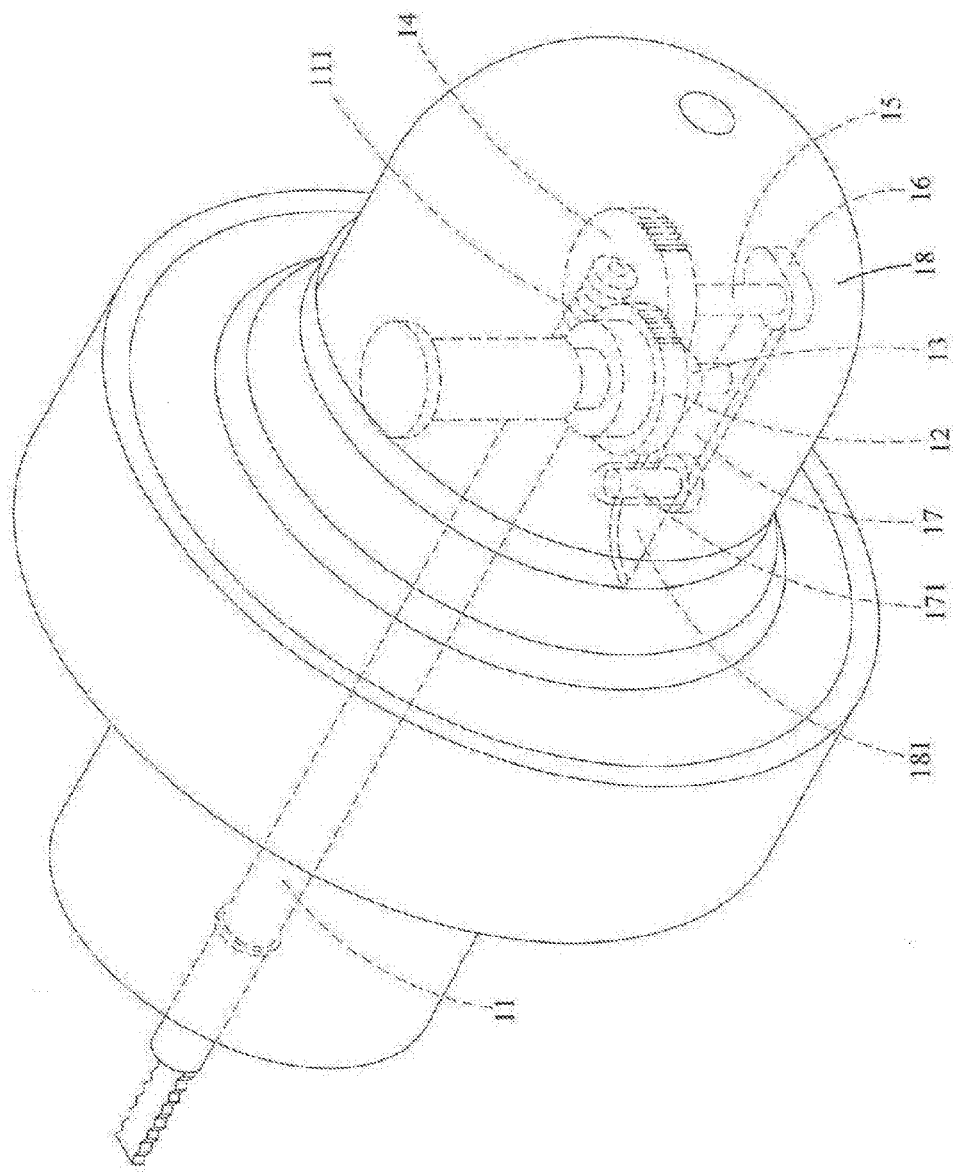
FIG. 1 is a schematic view showing a conventional fan oscillating mechanism.
Figure 2:
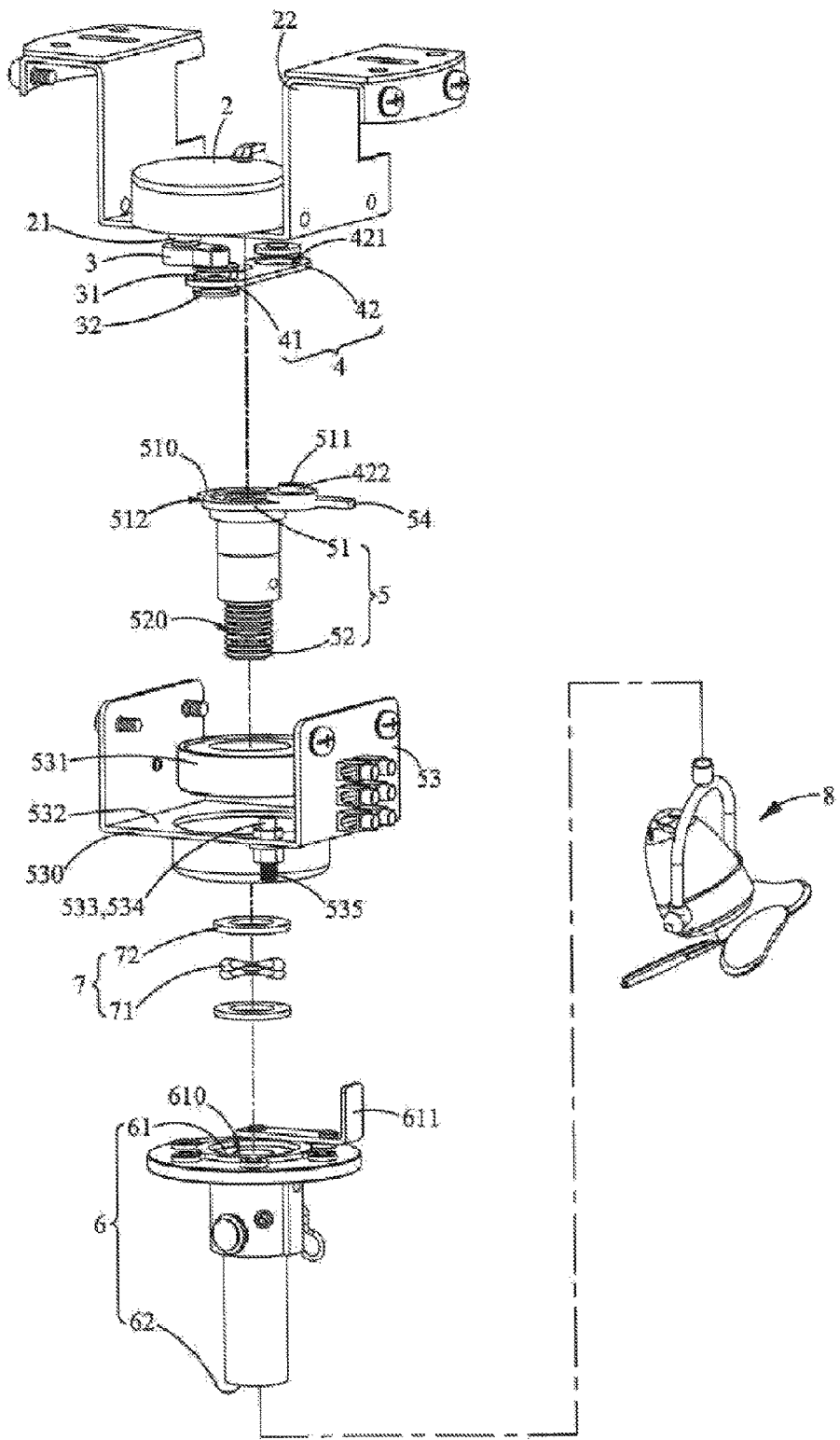
FIG. 2 is an exploded view of an embodiment of the present invention.
Figure 3:
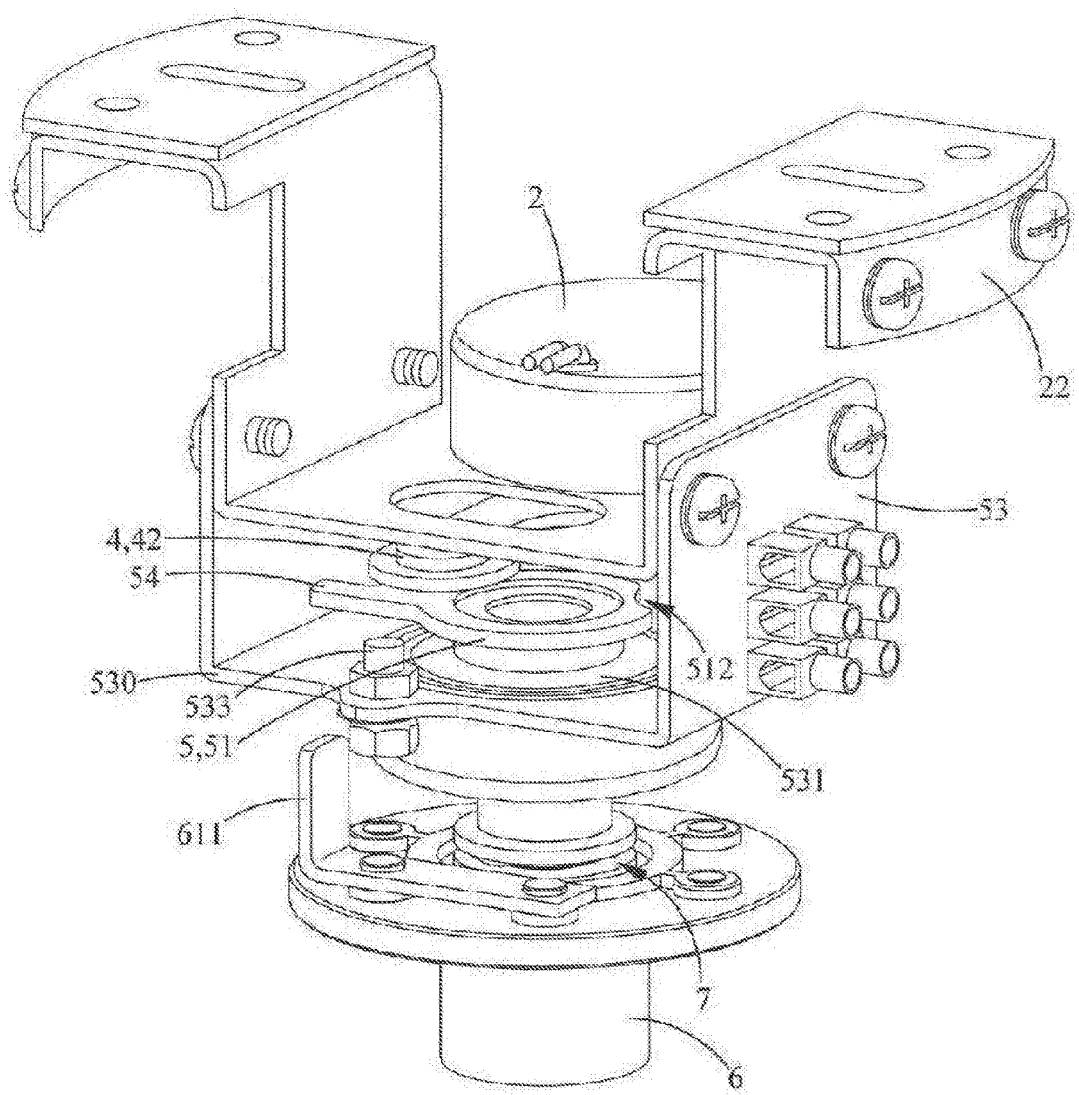
FIG. 3 is a perspective view of an embodiment of the present invention.
Figure 4:
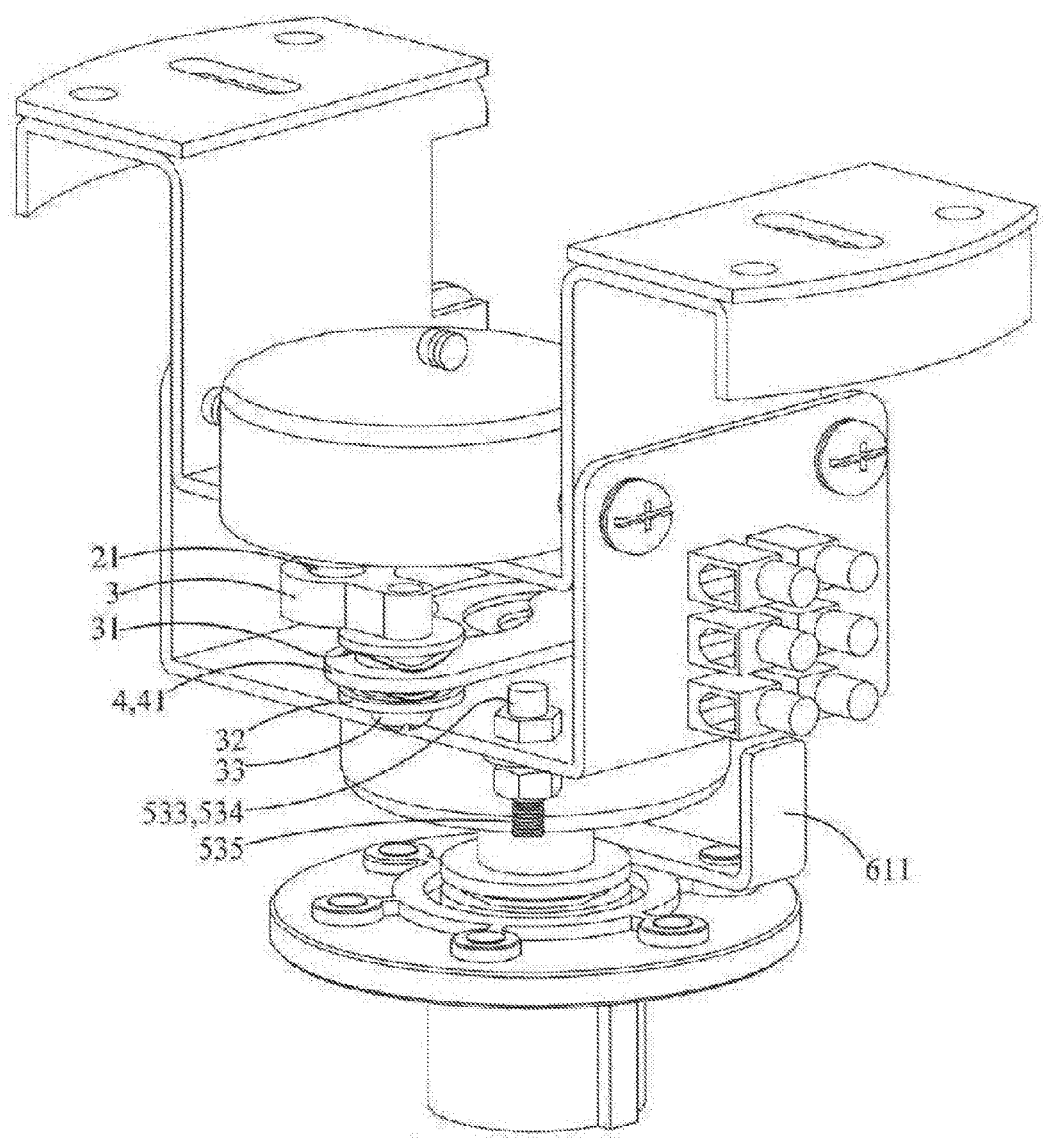
FIG. 4 is a perspective view of an embodiment of the present invention as viewed from another direction.

With reference to the accompanying drawings, FIG. 2 is an exploded view of the fan oscillating mechanism according to an embodiment of the present invention; FIG. 3 is a perspective view of the fan oscillating mechanism of the present invention; and FIG. 4 is a perspective view of the fan oscillating mechanism according to the present invention as viewed from another direction. The following embodiments are given using a ceiling fan as an implement example. However, the present invention is not restricted to the ceiling fan, some other fans are also within the realm of the present invention, which includes an oscillating mechanism therein such as a desk fan, standing fan or hanging fan.

As shown in the Figures, a motor 2 comprises a driving shaft 21 through which the motor outputs rotating torque. The motor 2 is fixed on a motor base 22 which can be attached to a wall or ceiling, depending on the installation site desired. The driving shaft 21 of the motor 2 is connected pivotally to one end of a crank plate 3, while the other end of the crank plate 3 is connected pivotally to a first end 41 of a connecting rod 4. In this embodiment, the first end 41 of the connecting rod 4 is held between two wave washers 31, and two flat washers 32 are respectively disposed on the upper side and lower side of the two respective wave washers 31. A locking screw 33 is provided to penetrate through the two wave washers 31, the two flat washers 32, and the first end 41 of the connecting rod 4, and is threaded to the other end of the crank plate 3 so that the first end 41 of the connecting rod 4 is pivotally connected with the locking screw 33. In this way, the arrangement of the wave washers 31 and the flat washers 32 provides sufficient cushioning and connection tolerance between the connecting rod 4 and the crank plate 3 so that the service life of the components is prolonged. In addition, the extension of the tolerance range facilitates the convenient assembly.

Furthermore, a second end 42 of the connecting rod 4 is connected pivotally to a head end 51 of a spindle link 5. The second end 42 of the connecting rod 4 has a slot 421. The end face 510 of the head end 51 of the spindle link 5 is provided with an axially extending raised post 511 at one side thereof. The raised post 511 is fitted with a sleeve 422 thereon and placed in the slot 421 along with the sleeve 422 in such a manner that the sleeve 422 is rotatable with respect to the raised post 511.

The slot 421 located at the second end 42 of the connecting rod 4, according to the present embodiment, can be an oval shaped slot. The slot 421 provides spaces for rotation and displacement during operation. Moreover, the assistance of the sleeve 422 provides, smooth operation between the connecting rod 4 and the spindle link 5 without interference occurring therebetween. Therefore, the service life of the elements is significantly extended. The slot 421 with an oval shape requires less labor and material than its conventional circular counterparts. Furthermore, as the tolerance range of the slot is extended, damage due to assembly error is reduced.

As compared with a circular slot, the oval shaped slot may cause the oscillation of the fan device to lag behind by a few seconds, whereby the fan device is prone to vibrate. To inhibit the vibration of the fan device, the slot 421 located at the second end 42 of the connecting rod 4 could be a conventional circular slot, so as to meet various user demands.

At the side of the end face of the head end 51 of the spindle link 5 opposite to the side where the raised post 511 is located, a cut-out 512 is provided. The cut-out 512 serves to reduce the spaces between the elements; thus preventing interference between the elements. Specifically, when the motor 2 rotates, the flat washers 32 below the crank plate 3 and the connecting rod 4 will interfere with the head end 51 of the spindle link 5. The cut-out 512 can effectively avoid such interference from happening. Likewise, the design of the cut-out 512 can save on material, reduce labor cost, and extend the tolerance range. Consequently, interference due to assembly error can be avoided.

As shown in FIGS. 2 and 3, a bearing collar 531 is mounted on a spindle base 53 which is fixed on the motor base 2. The spindle link 5 passes through the bearing collar 531. A stop block 54 extends radially outwards from the end face 510 of the head end 51 of the spindle link 5 at a location in proximity to the raised post 511. In this embodiment, the spindle base 53 is a U-shaped base, and two limiting screws 533 are screwed onto the upper surface 532 of the base plate 530. The stop block 54 provided on the head end 51 of the spindle link 5 reciprocates between the two limiting screws 533 along with the rotation of the spindle link 5. In this way, when the spindle link 5 rotates to move the stop block 54 to urge against one of the two limiting screws 533, the driving shaft 21 of the motor 2 revolves to cause the fan to rotate, which indirectly oscillates the fan in cycle. In other words, the two limiting screws 533 are used to limit the rotation range of the spindle link 5, i.e., the oscillation angle of the fan, which is set to be 110 degrees in this embodiment.

Further, the spindle link 5 is connected in series with a clutch member 7, and a tail end 52 of the spindle link 5 is connected to a fan suspension tube 6. In this embodiment, the clutch member 7 includes two wave washers 71 and two flat washers 72. The two wave washers 71 are disposed between the two flat washers 72. The clutch member 7 is fitted on the spindle link 5. In this manner, the clutch member 7 of this embodiment which is formed of two wave washers 71 and two flat washers 72, is simple in construction and low in cost. In addition, the rotational resistance of the clutch member 7 can be adjusted as desired by simply changing the quantity or the specification of the wave washer 71 and the flat washer 72.

Referring back to FIG. 2, in this embodiment, the tail end 52 of the spindle link 5 has an external thread 520 provided thereon, while the top end 61 of the fan suspension tube 6 has an inner thread 610 provided thereon. The inner thread 610 on the top end 61 of the fan suspension tube 6 is to be engaged with the external thread 520 on the tail end 52 of the spindle link 5. Moreover, one of the two limiting screws 533 is a longer screw 534, which extends through the base plate 530 of the spindle base 53 and has an abutting segment 535 that protrudes downwards. In addition, a baffle plate 611 is provided on the top end 61 of the fan suspension tube 6. The baffle plate 611 is designed to be stopped by the abutting segment 535 so as not to rotate beyond 360 degrees. When the fan suspension tube 6 is in a free state, the abutting segment 535 stops the baffle plate 611 from rotating beyond 360 degrees and breaking the wire. Furthermore, the connected fan suspension tube 6 is precluded from over-rotation and subsequently loosening and falling off. As for a tail end 62 of the fan suspension tube 6, it is connected to a fan device 8.

The operation of this embodiment is detailed as follows. As the clutch member 7 is formed of the wave washers 71 and the flat washers 72, a rotational resistance is provided. When the motor 2 is actuated, the driving shaft 21 rotates the crank plate 3 to move the connecting rod 4 so as to rotate the spindle link 5. However, as the rotating torque induced by the spindle link 5 is less than the rotational resistance of the clutch member 7 in magnitude, the fan suspension tube 6 is moved by the spindle link 5 so as to facilitate the oscillation of the fan device 8. This is the normal operating state in which the oscillation of the fan device 8 is actuated by the motor 2. On the other hand, when it is desired to adjust the orientation of the fan device 8, an external rotational force is applied onto the fan device 8. When the external rotational force is greater than the rotational resistance of the clutch member 7, the fan suspension tube 6 runs freely and the oscillation angle can be adjusted as desired. In this manner, due to the provision of the clutch member 7, the oscillation angle of the fan can be adjusted at the user's will. In addition, the damage to the oscillating mechanism or the motor resulting from inappropriately applied external force can be effectively precluded.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An oscillating mechanism, comprising:
   a driving shaft;
   a crank plate having one end connected pivotally to the driving shaft; a connecting rod having a first end and a second end, wherein the first end is connected pivotally to the other end of the crank plate;
   a spindle link having a head end connected pivotally to the second end of the connecting rod, and a tail end;
   a suspension tube having a top end connected to the tail end of the spindle link; and
   a clutch member having at least one wave washer disposed between the spindle link and the suspension tube, wherein the clutch member includes two wave washers and two flat washers, the two wave washers are disposed between the two flat washers.

2. The oscillating mechanism as claimed in claim 1, wherein the clutch member is fitted on the spindle link.

3. The oscillating mechanism as claimed in claim 1, wherein the head end of the spindle link is provided with a transverse cut-out at one side of an end face thereof.

4. The oscillating mechanism as claimed in claim 1, further comprising two wave washers, two flat washers, and one locking screw, the first end of the connecting rod is held between the two wave washers; the two flat washers are respectively disposed on the upper side and the lower side of the two wave washers; and the locking screw is disposed to penetrate through the two wave washers, the two flat washers and the first end of the connecting rod and is screwed onto the other end of the crank plate.

5. The oscillating mechanism as claimed in claim 1, further comprising a motor base on which a motor is mounted, and a spindle base fixed to the motor base; wherein the spindle base includes a bearing collar through which the spindle link penetrates and connects to the top end of the suspension tube.

6. The oscillating mechanism as claimed in claim 5, wherein the spindle base is a U-shaped base having a base plate, and two limiting screws are screwed onto the upper surface of the base plate; a stop block is transversely disposed on the end face of the head end of the spindle link and is arranged to reciprocate between the two limiting screws along with the rotation of the spindle link.

7. The oscillating mechanism as claimed in claim 6, wherein the suspension tube has a baffle plate provided on the top, and one of the two limiting screws is a longer screw extending through the base plate of the spindle base, the longer screw has a downwardly protruding abutting segment configured to stop the baffle plate from rotating beyond 360 degrees when the suspension tube is in a free state.

8. The oscillating mechanism as claimed in claim 1, wherein the clutch member provides a rotational resistance such that when the driving shaft rotates the crank plate to move the connecting rod to rotate the spindle link, whereby the spindle link induces a rotating torque that is less than the rotational resistance of the clutch member, and thus the spindle link moves the suspension tube to rotate.

9. The oscillating mechanism as claimed in claim 1, wherein the suspension tube runs freely when the suspension tube is subjected to an external rotational force greater than the rotational resistance of the clutch member.

10. The oscillating mechanism as claimed in claim 1, wherein the second end of the connecting rod has an oval slot, the head end of the spindle link is provided with an axially extending raised post, and the raised post is placed in the oval slot.

11. The oscillating mechanism as claimed in claim 10, further comprising a sleeve, and the raised post is fitted with the sleeve.

12. The oscillating mechanism as claimed in claim 1, further comprising a fan device connected to a bottom end of the suspension tube.

13. A ceiling fan, comprising:
   a transmission mechanism including a driving shaft, a crank plate having one end connected pivotally to the driving shaft, and a connecting rod having a first end connected pivotally to the other end of the crank plate, and a second end;
   a clutch member connecting to a fan suspension tube;
   a spindle link coupling the transmission mechanism with the clutch member;
   wherein the clutch member provides a rotational resistance; when the driving shaft rotates the crank plate to move the connecting rod so as to rotate the spindle link, whereby the spindle link induces a rotating torque that is less than the rotational resistance of the clutch member; and thus the spindle link moves the fan suspension tube to rotate; and
   a fan device connected to a bottom end of the suspension tube,
   wherein the second end of the connecting rod has an oval slot, a head end of the spindle link is provided with an axially extending raised post, and the raised post is placed in the oval slot.

14. The ceiling fan as claimed in claim 13, wherein the clutch member includes at least one wave washer disposed between the spindle link and the fan suspension tube.

15. The ceiling fan as claimed in claim 13, wherein the fan suspension tube runs freely when the fan suspension tube is subjected to an external rotational force greater than the rotational resistance of the clutch member.

16. An oscillating mechanism, comprising:
A driving shaft;
a crank plate having one end connected pivotally to the driving shaft;
a connecting rod having a first end and a second end, wherein the first end is connected pivotally to the other end of the crank plate;
two wave washers;
two flat washers; and
one locking screw;
wherein the first end of the connecting rod is held between the two wave washers, the two flat washers are respectively disposed on the upper side and the lower side of the two wave washers, and the locking screw is configured to fix the connecting rod between the wave washers;
further comprising a clutch member disposed between a spindle link and a suspension tube;
wherein the clutch member includes two additional wave washers and two additional flat washers, the two additional wave washers are disposed between the two additional flat washers, and the clutch member is fitted on the spindle link.

\* \* \* \* \*